United States Patent
Dhanda et al.

(10) Patent No.: US 9,349,400 B1
(45) Date of Patent: May 24, 2016

(54) MAGNETIC RECORDING DISK DRIVE WITH ADJUSTABLE DATA TRACK PITCH AND COMPENSATION FOR REPEATABLE RUNOUT (RRO)

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US); Satoshi Yamamoto, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/749,814

(22) Filed: Jun. 25, 2015

(51) Int. Cl.
  *G11B 5/596* (2006.01)
  *G11B 5/55* (2006.01)

(52) U.S. Cl.
  CPC .......... *G11B 5/59627* (2013.01); *G11B 5/5543* (2013.01); *G11B 5/59655* (2013.01)

(58) Field of Classification Search
  None
  See application file for complete search history.

(56) References Cited

U.S. PATENT DOCUMENTS

| | | | |
|---|---|---|---|
| 6,141,175 A | 10/2000 | Nazarian et al. | |
| 6,608,731 B2 | 8/2003 | Szita | |
| 6,785,084 B2 | 8/2004 | Szita | |
| 7,082,008 B2 * | 7/2006 | Ashikaga | G11B 5/59627 360/77.04 |
| 7,315,431 B1 | 1/2008 | Perlmutter et al. | |
| 7,656,605 B1 | 2/2010 | Sutardja | |
| 7,787,209 B1 * | 8/2010 | Liikanen | G11B 5/59627 360/77.04 |
| 8,482,877 B2 * | 7/2013 | Akagi | G11B 5/59633 360/77.04 |
| 8,693,134 B1 * | 4/2014 | Xi | G11B 5/59627 360/77.04 |
| 8,711,504 B1 | 4/2014 | Everett et al. | |
| 8,724,248 B2 | 5/2014 | Dhanda et al. | |
| 8,797,672 B2 | 8/2014 | Tanabe et al. | |
| 8,861,116 B2 | 10/2014 | Nishiyama et al. | |
| 8,922,925 B1 | 12/2014 | Coker et al. | |
| 2009/0244759 A1 * | 10/2009 | Mori | G11B 5/59627 360/47 |
| 2011/0051286 A1 * | 3/2011 | Pokharel | B82Y 10/00 360/131 |
| 2013/0342929 A1 | 12/2013 | Coker et al. | |

OTHER PUBLICATIONS

Jia et al., "Repeatable runout disturbance compensation with a new data collection method for hard disk drive", Magnetics, IEEE Transactions on (vol. 41, Issue: 2) pp. 791-796.

* cited by examiner

*Primary Examiner* — Wayne Young
*Assistant Examiner* — James L Habermehl
(74) *Attorney, Agent, or Firm* — Thomas R. Berthold (57) ABSTRACT

A hard disk drive with adjustable data track pitch has repeatable runout (RRO) fields stored in he servo sectors for each servo sector of each servo track, and thus without the need to store the RRO fields in the data tracks. The RRO fields for each servo sector have a radial length of at least two servo tracks (i.e., equal to or greater than twice the servo track pitch). The RRO fields in each servo track are shifted radially from RRO fields in adjacent servo tracks and circumferentially spaced from RRO fields in adjacent servo tracks. The read head reads two different RRO fields from the two servo tracks closest to the data track and the servo electronics interpolates a RRO value from these two RRO values. Thus even if the data track pitch is changed, RRO values can be obtained.

16 Claims, 8 Drawing Sheets

MAGNETIC RECORDING DISK DRIVE WITH ADJUSTABLE DATA TRACK PITCH AND COMPENSATION FOR REPEATABLE RUNOUT (RRO)

BACKGROUND OF THE INVENTION

1. Field of the Invention

This invention relates generally to magnetic recording hard disk drives (HDDs), and more particularly to a HDD that has adjustable data track pitch.

2. Description of the Related Art

HDDs typically have disks with data tracks with a fixed track spacing or pitch that is set during manufacturing and cannot be changed during the life of the HDD. The positioning of the read/write heads to the data tracks is accomplished by servo tracks that have angularly-spaced servo sectors that contain head positioning information. The servo sectors extend radially across the data tracks. The read head detects the positioning information as the disk rotates and passes the position information to a servo control system to maintain the head on the desired data track. The servo tracks also have a fixed track pitch that is set during manufacturing and that may be different from the fixed track pitch of the data tracks.

A head following the center of a servo track moves along a perfectly circular path around the disk. In reality, however, as a head attempts to follow a servo track it will not follow a perfect circular path. Instead, the head will deviate from the desired circular path due to a variety of factors, including disk irregularity, disk eccentricity, and/or misalignments of the spindle axis assembly. This deviation from the desired path is referred to as "runout." Repeatable runout (RRO) refers to deviation that is non-random and occurs with some predictability. During disk drive manufacturing, RRO can be measured and corresponding RRO offset values for each servo sector in each servo track can be determined. Such RRO correction data can be stored in the disk drive. In HDDs with data tracks having a fixed track pitch, this RRO information is stored in the data tracks.

In certain HDDs it may be desirable to change the data track pitch during the life of the HDD. For example, the HDD may be operating in a high-vibration environment, in which case it may be desirable to increase the data track pitch. A HDD with adjustable data track pitch to compensate for vibration is described in U.S. Pat. No. 8,724,248 B2, assigned to the same assignee as this application. However, the prior art method of storing RRO fields in the data tracks will not work in a HDD with adjustable data track pitch because the old data tracks will be overwritten when the new data tracks with a different track pitch are written.

What is needed is a magnetic recording disk drive with adjustable data track pitch that can compensate for RRO of the servo tracks.

SUMMARY OF THE INVENTION

Embodiments of this invention relate to a HDD with adjustable data track pitch (TP) that allows for the use of RRO fields stored in the servo sectors for each servo sector of each servo track, and thus without the need to store the RRO fields in the data tracks. The RRO fields for each servo sector have a radial length of at least two servo tracks (i.e., equal to or greater than twice the servo TP). The RRO fields in each servo track are shifted radially from RRO fields in adjacent servo tracks and circumferentially spaced from RRO fields in adjacent servo tracks. The read head reads two different RRO fields from the two servo tracks closest to the data track and the servo electronics interpolates a RRO value from these two RRO values. Thus even if the data TP is changed, RRO values can be obtained.

During manufacturing of the HDD, the RRO for each servo track is measured using well-known techniques and corresponding RRO offset values for each servo sector in each servo track are determined. These RRO offset values are then written in the RRO fields of the servo sectors. In a shingled magnetic recording (SMR) HDD the write head is wider than the read head so it is possible to write the servo fields with only a single pass of the write head.

In the operation of the HDD with embodiments of the invention the hard disk controller (HDC) receives a command to read a data track. The HDC identifies, typically from a look-up table of data track numbers and servo track numbers, the servo track closest to that data track and the amount of radial offset of that data track from the identified servo track. The look-up table may also include a slot number for where the RRO field is circumferentially located for each servo track. The servo electronics then causes the actuator to position the read head to that radial location, and the servo sectors begin to pass the read head. The read head detects the position error signal (PES) from the servo sectors, which the servo electronics uses to maintain the position of the read head approximately on the data track centerline. The read head also reads the RRO fields from the slots in the two nearest servo tracks. The servo electronics processor calculates a RRO value by interpolation from the values in the two RRO fields. This RRO value is then used to modify the PES. Thus as the servo sectors pass the read head the interpolated RRO values are fed forward into the servo control loop. These interpolated RRO values thus represent the runout of the data track.

When the data TP is changed, a new table of data track numbers and servo track numbers is generated. However, because the RRO fields are stored in the servo tracks, which retain their fixed track pitch, and because the RRO fields have a radial length of at least two servo tracks, the same method of interpolation of the two RRO values can be used.

For a fuller understanding of the nature and advantages of the present invention, reference should be made to the following detailed description taken together with the accompanying figures.

DETAILED DESCRIPTION OF THE INVENTION

Figure 1:
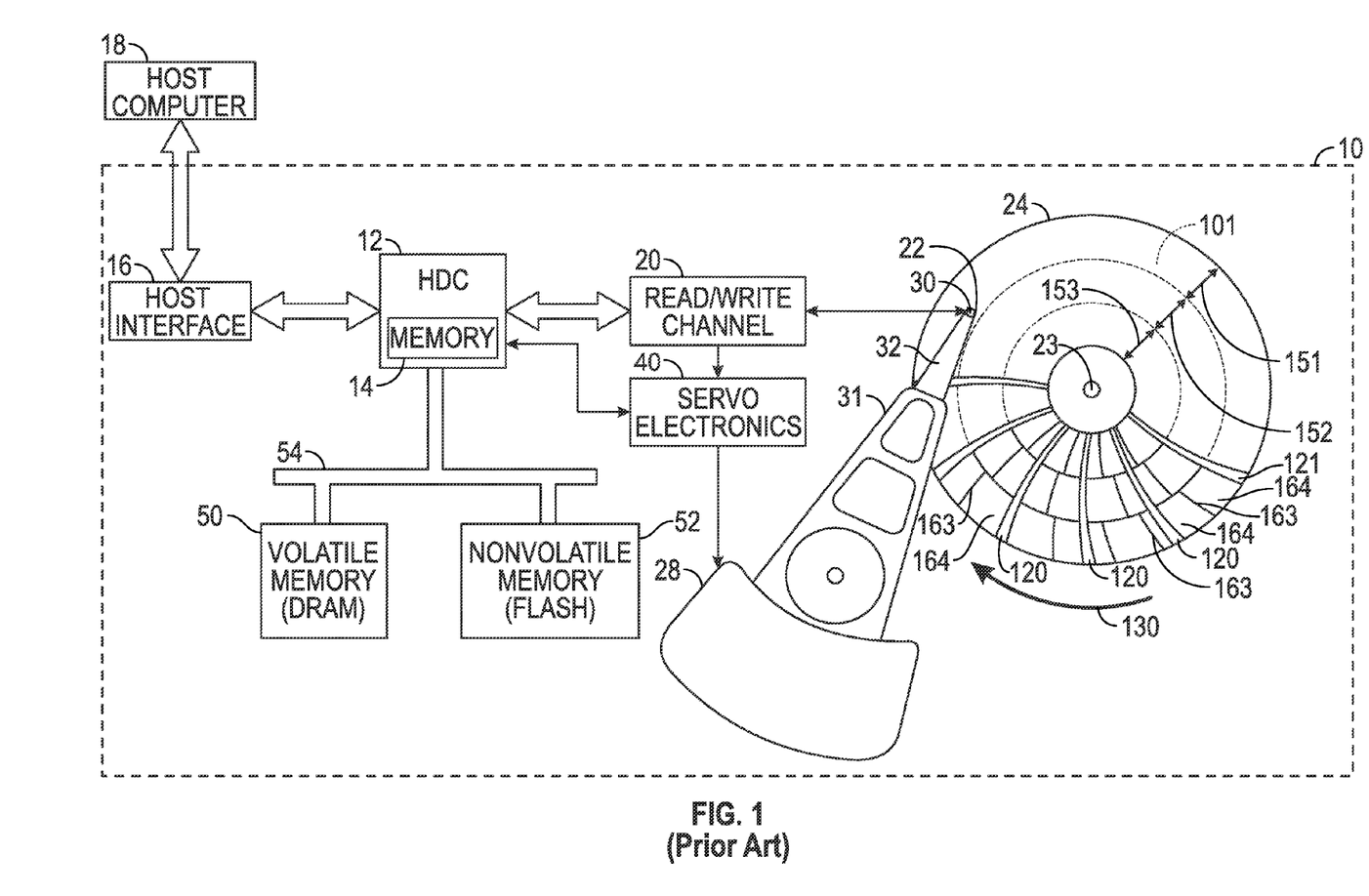
FIG. 1 is a block diagram of a magnetic recording disk drive (HDD) according to the prior art.

FIG. 1 is a block diagram of a magnetic recording disk drive (HDD) 10 according to the prior art. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has a magnetic recording layer that includes radially-spaced concentric data tracks with a fixed track spacing or track pitch (TP). The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 is preceded by a synchronization (sync) field, such as typical sync fields 163. The sync fields 163 are detectable by the read head for enabling synchronization of reading and writing in the data sectors 164.

The disk also includes radially-spaced concentric servo tracks that have a fixed track spacing or pitch (TP) that is typically different from the TP of the data tracks. Because the data TP and servo TP are different, there is not a one-to-one relationship of data tracks to servo tracks, so the radial position of each data track is identified by its nearest servo track plus an offset from that servo track. The servo tracks are not continuous but are formed as a group of angularly-spaced servo sectors 120. The servo sectors 120 contain position error signal (PES) information detectable by the read head for moving the head 22 to desired data tracks and maintaining the head 22 on the data tracks. The servo sectors in each servo track are aligned circumferentially with the servo sectors in the other servo tracks so that they extend across the servo tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a servo track typically contains a servo timing mark (STM) that indicates the start of the servo sector, a servo track identification (TID) code, and a portion of a pattern of magnetized blocks or high-frequency bursts that form head position error signal (PES) fields. The PES fields are detected by the read head and decoded to provide a PES, which is a measure of how far the head is off track from the data track centerline. Typically there are multiple data sectors 164 located between the servo sectors 120.

Figure 2:
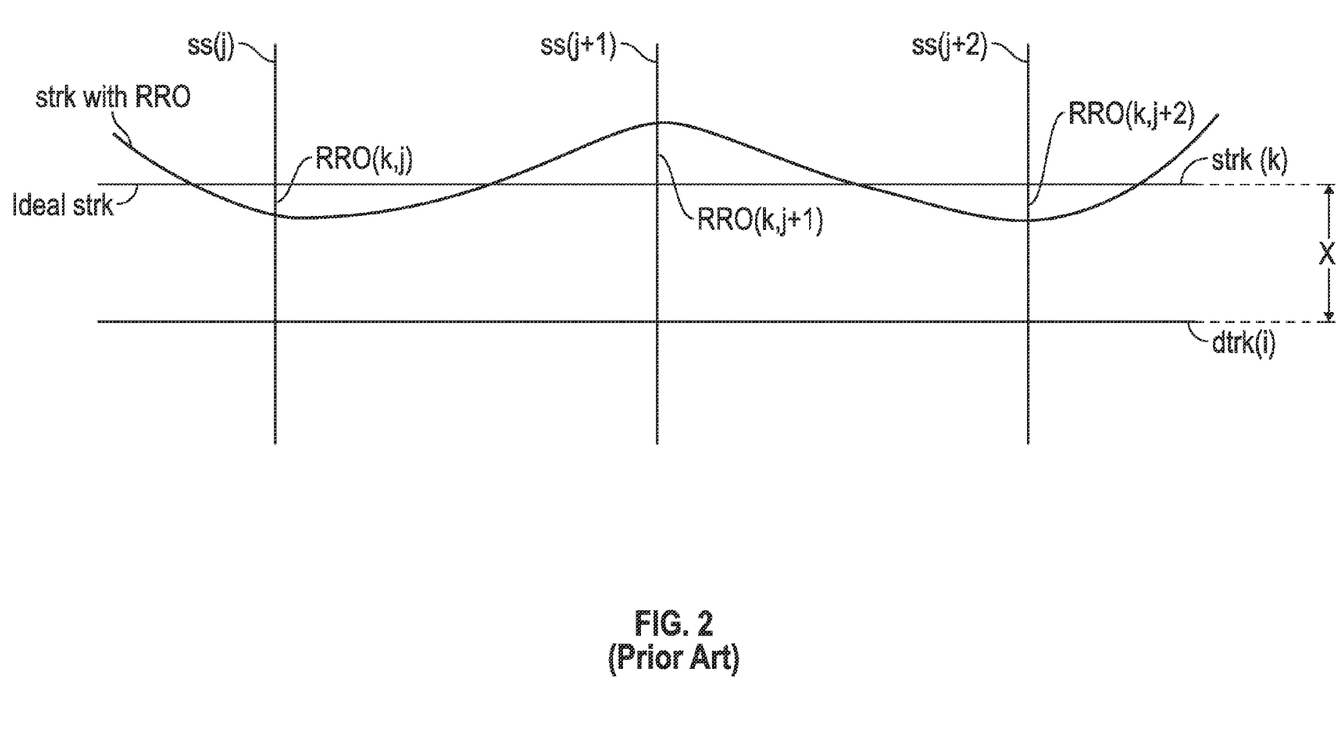
FIG. 2 is a schematic depicting typical repeatable runout (RRO) for a portion of a servo track and shows the deviation from a perfectly circular path at three servo sectors.

Ideally, a head following the center of a servo track moves along a perfectly circular path around the disk. In reality, however, as a head attempts to follow a servo track it will not follow a perfect circular path. Instead, the head will deviate from the desired circular path due to a variety of factors, including disk irregularity, disk eccentricity, and/or misalignments of the spindle axis assembly. This deviation from the desired path is referred to as "runout." Repeatable runout (RRO) refers to deviation that is non-random and occurs with some predictability. FIG. 2 is a schematic depicting a portion of a data track (dtrk(i)) offset by $x_i$ from a servo track (strk(k)) and shows the deviation of the servo track from a perfectly circular path at three servo sectors (SS(j), SS(j+1), SS(j+2)) due to RRO. The RRO values at each servo sector for strk(k) are shown as RRO(k, j), RRO(k, j+1), and RRO(k, j+2). During disk drive manufacturing, RRO can be measured and corresponding RRO offset values for each servo sector in each servo track can be determined. Such RRO correction data can be stored in the disk drive, for example as RRO fields in the data tracks adjacent the servo sectors. U.S. Pat. No. 6,310,742 describes a method for calculating RRO values and storing the RRO values in a table or in RRO fields in the servo sectors.

Referring again to FIG. 1, the electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the PES information from the servo sectors 120 to run a servo control loop that produces a control signal representative of head radial position. The RRO information is fed forward into the servo control loop to compensate for the RRO of the particular servo track being read and thus modify the control signal so the head more closely follows the actual shape of the servo track. The control signal is converted to a current that drives actuator 28 to position the head 22.

In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, data track and data sector. The data track number is used to extract from a table the number of the servo track closest to the desired data track and the amount of radial offset of the data track from that servo track. The numbers are passed to servo electronics 40 to enable positioning head 22 to the appropriate data sector 164. The servo control system enables the head used for reading and writing to be spatially aligned within a fraction of a track-pitch in the radial direction of the disk.

The controller 12 acts as a data controller to transfer blocks of write data from the host computer 18 through the read/ write channel 20 for writing to the disks 24 by the heads 22, and to transfer blocks of read data from the disks 24 back to the host computer 18. HDDs typically include, in addition to the rotating disk storage, solid-state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

The HDD 10 may also be a HDD that uses "shingle writing", also called "shingled recording" or "shingled magnetic recording" (SMR). SMR HDDs are well-known, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

Figure 3:
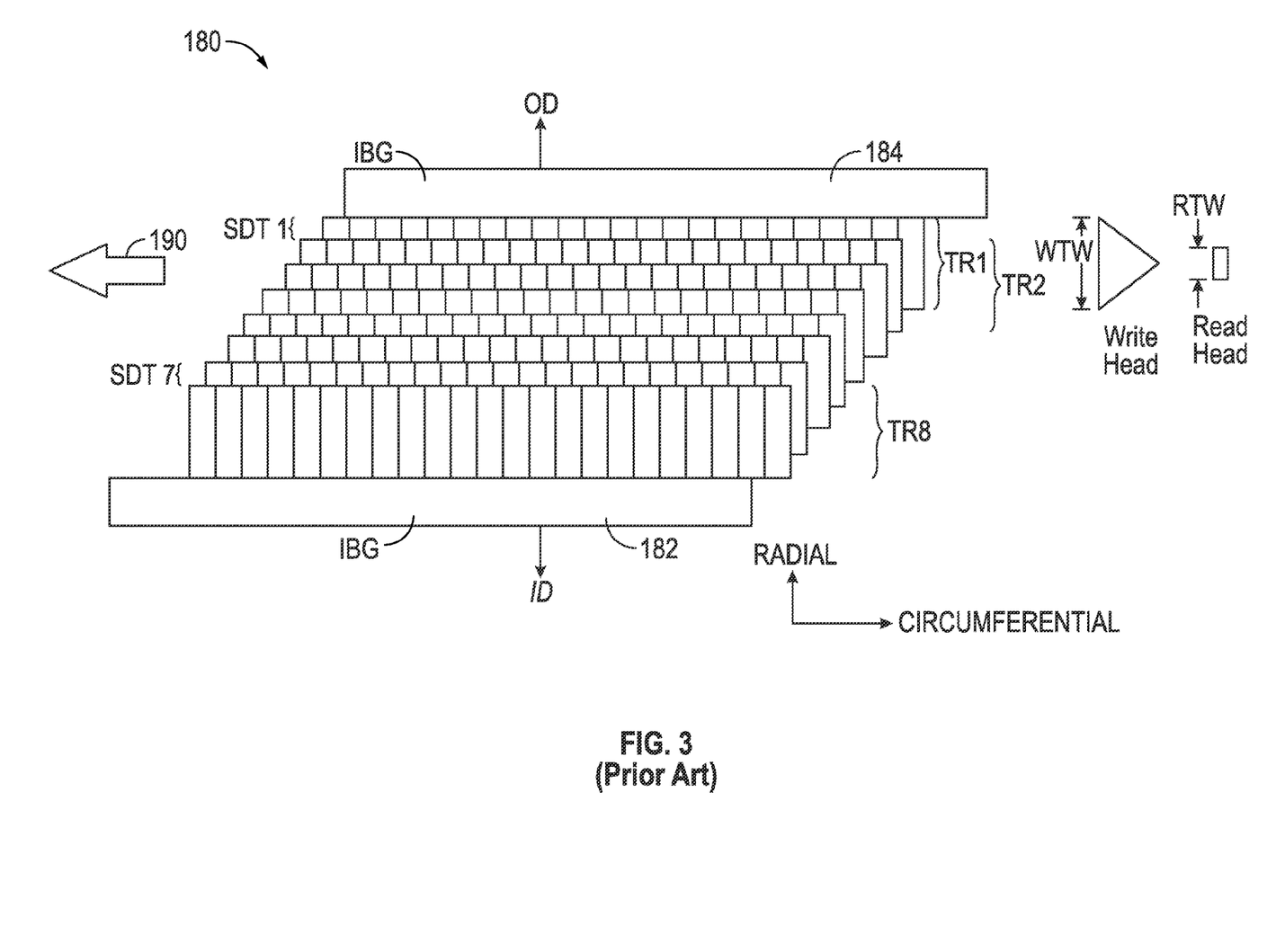
FIG. 3 is a schematic of a shingled region or band of a disk for describing the method of operation of a shingled magnetic recording (SMR) HDD.

FIG. 3 is a schematic of a shingled region or band 180 for use in describing the method of SMR. A typical band will have a large number, i.e., several hundred or thousand, shingled data tracks (SDTs); however only 7 are shown in band 180 for ease of illustration. Band 180 has inter-band gaps (IBGs) 182, 184 that separate it from radially adjacent bands. The write head makes successive paths or tracks (TRs) to form the SDTs, which in the example of FIG. 3 are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 190. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 3, the shingled data tracks are written in the direction from the disk OD to ID. However, a disk drive can be formatted such that writing of the shingled data tracks in one or more bands can be from ID to OD, with different bands being written in different directions. SMR HDDs also have servo tracks with servo sectors, and data tracks with a TP different from the TP of the servo tracks.

Figure 4:
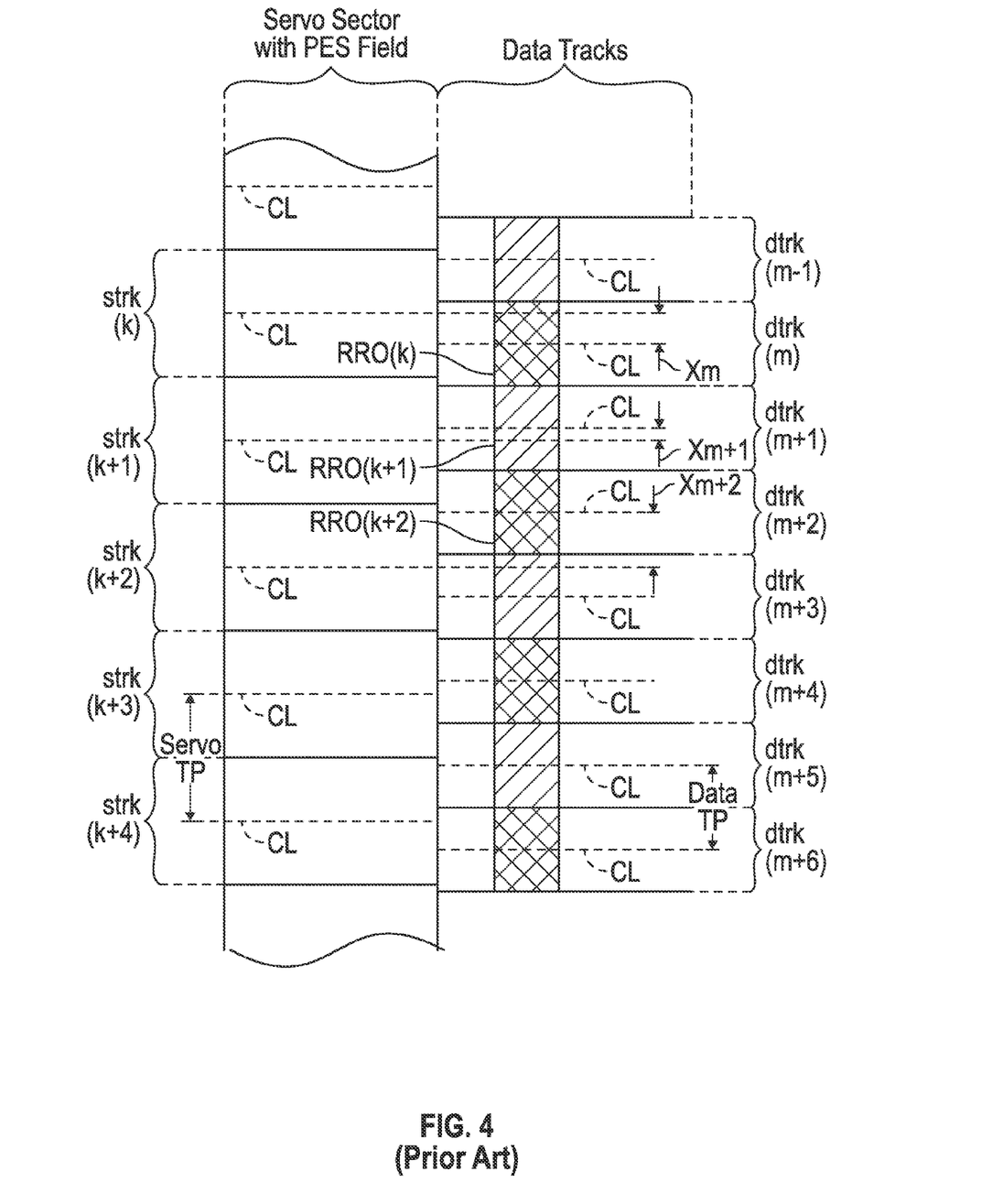
FIG. 4 is a schematic of a portion of a servo sector showing servo tracks and data tracks with RRO fields according to the prior art.

FIG. 4 is a view of a portion of a servo sector showing servo tracks and data tracks with RRO fields according to the prior art. The servo sector contains PES fields and is shown extending across five servo tracks (strk(k) through strk(k+4)). The servo tracks have centerlines (CLs) and a fixed TP. Five servo tracks are shown (strk(k) through strk(k+4)) with CLs and a fixed TP. Seven data tracks are shown (dtrk(m−1) through dtrk(m+6) with CLs and a fixed TP. As shown, the data TP is different from the servo TP, so there is not a one-to-one relationship between the data tracks and the servo tracks. Instead each data track has a nearest servo track and a fixed offset from that servo track. For example, dtrk(m) is offset by a radial distance $x_m$ from strk(k), dtrk(m+1) is offset by a radial distance $x_{m+1}$ from strk(k+1), and dtrk(m+2) is offset by a radial distance $x_m+2$ from strk(k+2). The servo TP and data TP are fixed during manufacturing and cannot be changed during the life of the HDD. During manufacturing the RRO values for each servo sector of a servo track are calculated and stored in RRO fields located in the nearest data track adjacent the servo sectors. This is shown by RRO(k) in dtrk(m), RRO(k+1) in dtrk(m+1), and RRO(k+2) in dtrk(m+2). During a read operation, for example reading dtrk(m), the servo electronics uses the PES fields from strk(k) and strk(k+1) to maintain the head approximately on the CL of dtrk(m). The servo electronics uses the RRO(k) field stored in dtrk(m) as a feed-forward to the servo control loop to compensate for the RRO of strk(k).

In certain HDDs it may be desirable to change the data TP during the life of the HDD. For example, in a SMR HDD it may be discovered that the data tracks in a particular region are too closely spaced and are causing readback errors. The data tracks in that region can be re-written with a larger TP. In another example, the HDD may be operating in a high-vibration environment, in which case it may be desirable to increase the data TP. A HDD with adjustable data TP to compensate for vibration is described in U.S. Pat. No. 8,724,248 B2, assigned to the same assignee as this application. To change the data TP, the HDC and servo electronics will cause the actuator to move the write head radially incrementally according to the new TP. However, the prior art method of storing RRO fields in the data tracks, as shown and described with FIG. 4, will not work in a HDD with adjustable data TP because the old data tracks will be overwritten when the new data tracks with a different TP are written.

Embodiments of this invention relate to a HDD with adjustable data TP that allows for the use of RRO fields stored in the servo sectors for each servo sector of each servo track, and thus without the need to store the RRO fields in the data tracks. The RRO fields for each servo sector have a radial length of at least two servo tracks (i.e., equal to or greater than twice the servo TP). The read head reads two different RRO fields from the two servo tracks closest to the data track and the servo electronics interpolates a RRO value from these two RRO values. Thus even if the data TP is changed, RRO values can be obtained.

Figure 5:
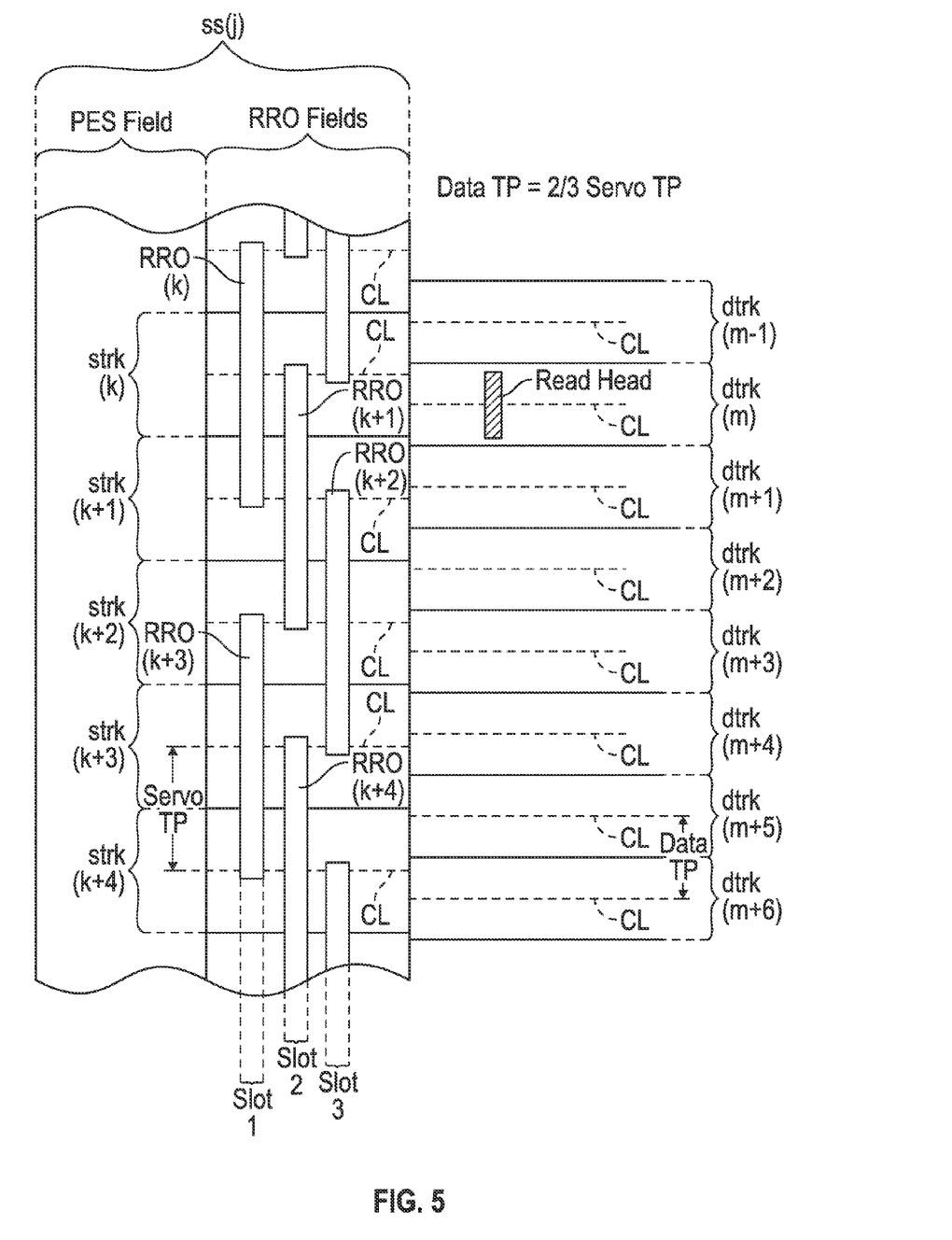
FIG. 5 is a view of a portion of a servo sector showing servo tracks and data tracks with RRO fields stored in the servo tracks according to an embodiment of the invention.

FIG. 5 is a view of a portion of a servo sector showing servo tracks and data tracks with RRO fields stored in the servo tracks according to an embodiment of the invention. There are multiple servo sectors generally equally angularly spaced around the servo tracks, as shown by servo sectors 120 in FIG. 1, but only one servo sector is shown for sector j (SS(j)). Each servo sector includes PES fields for head positioning and RRO fields. Each servo track (strk) has a RRO field at each servo sector that is centered at the servo track centerline (CL) and has a radial length of at least two servo tracks. The RRO fields in adjacent servo tracks are located in angularly (circumferentially) spaced slots, as shown by strk(k) with RRO(k) field in slot1, strk(k+1) with RRO(k+1) field in slot2, and strk(k+2) with RRO(k+2) field in slot3. In one embodiment, as shown in FIG. 5, there are three angularly spaced RRO fields. The pattern of radially-shifted and angularly-spaced RRO fields in three adjacent servo tracks form a pattern that repeats radially every fourth servo track, for example as shown by RRO(k+3) field that is aligned in the same circumferential position as RRO(k) field in slot1. The servo TP is fixed, but the data TP can be adjusted during the life of the HDD. In this example the data tracks have a TP that is $\frac{2}{3}^{rd}$ the servo TP. When the read head is located in any data track, it will read two different RRO fields for the two closest servo tracks. For example, the read head is shown in data track dtrk(m), so that when it passes the servo sectors it will read RRO(k) from strk(k) and RRO(k+1) from strk(k+1). Similarly, if the read head were located in dtrk(m+2), the two nearest servo tracks are strk(k+1) and strk(k+2), so the read head would read RRO(k+1) in slot2 and RRO(k+2) in slot3.

The RRO fields in FIG. 5 are written during the servowriting process that writes the information in the servo sectors of the servo tracks. During disk drive manufacturing, the RRO for each servo track is measured using well-known techniques and corresponding RRO offset values for each servo sector in each servo track are determined. These RRO offset values are then written in the RRO fields of the servo sectors. In conventional HDDs the write head and read head have approximately the same cross-track width corresponding approximately to the data TP, so multiple passes of the write head would be required to write the RRO fields because they extend radially across more than one servo track. However, in a SMR HDD, the write head is wider than the read head so an advantage of the invention in SMR HDDs is that it is possible to write the servo fields with only a single pass of the write head.

The following is a description of one method in which the RRO fields stored in the servo sectors may be used. The HDC receives a command to read a data track. The HDC identifies, typically from a look-up table of data track numbers and servo track numbers, the servo track closest to that data track and the amount of radial offset (x) of that data track from the identified servo track. The look-up table may also include the slot number for where the RRO field is located for each servo track. The servo electronics then causes the actuator to position the read head to that radial location, and the servo sectors begin to pass the read head. The read head detects the PES from the servo sectors, which the servo electronics uses to maintain the position of the read head approximately on the data track CL. The read head also reads the RRO fields from the slots in the two nearest servo tracks. The servo electronics processor calculates a RRO value by interpolation from the values in the two RRO fields. This RRO value is then used to modify the PES. Thus as the servo sectors pass the read head the interpolated RRO values are fed forward into the servo control loop. These interpolated RRO values thus represent the runout of the data track. When the data TP is changed, a new table of data track numbers and servo track numbers is generated. However, because the RRO fields are stored in the servo tracks, which retain their fixed track pitch, and because the RRO fields have a radial length of at least two servo tracks, the same method of interpolation of the two RRO values can be used.

Figure 6A:
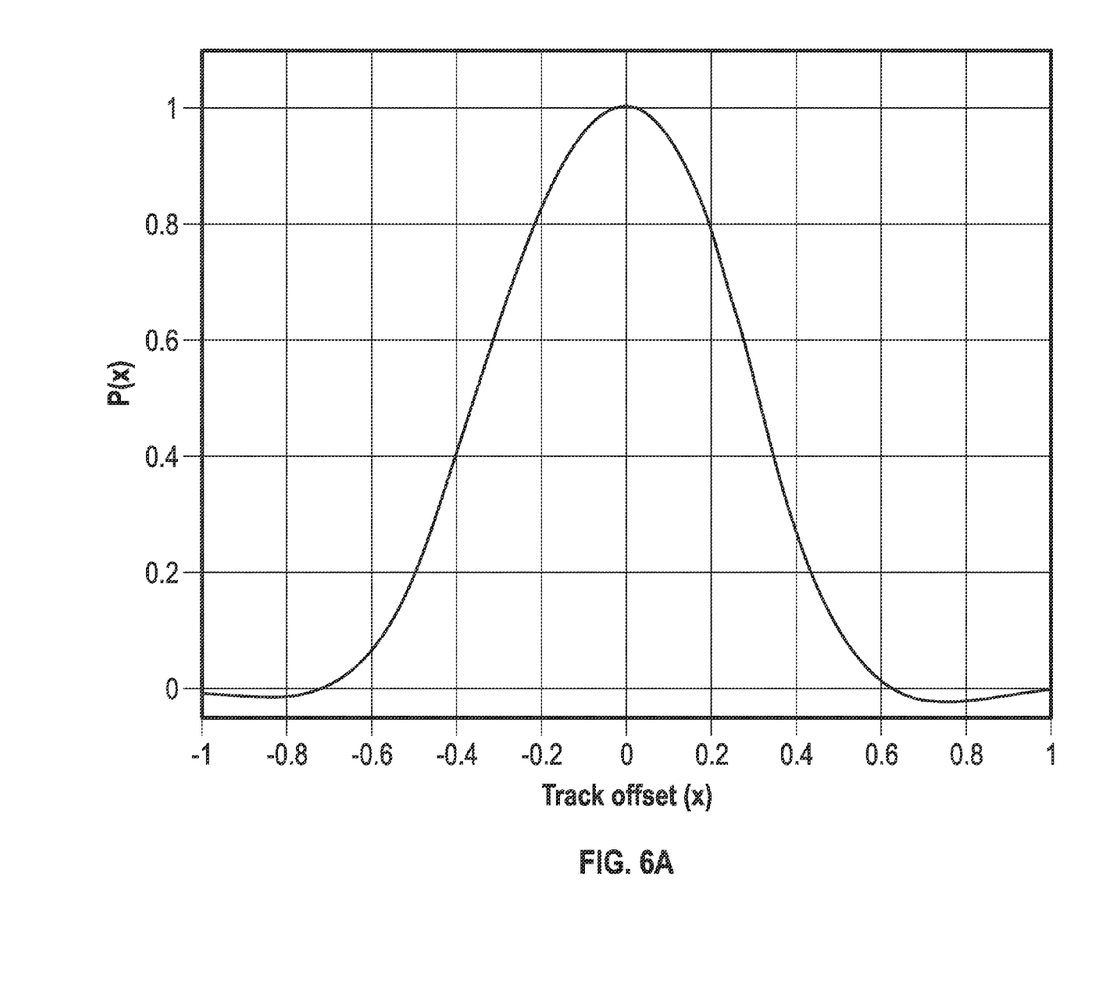
FIG. 6A is a graph of the function P(x) used to calculate the data track RRO by interpolation of two servo track RRO values.

The interpolated RRO values for a data track (DRRO) from the RRO values in the servo tracks (SRRO) is given by the following equation:

$$DRRO(k,x_i,j)=P(x_i)SRRO(k,j)+P(-(1-x_i))SRRO(k+1,j) \quad \text{Equation (1)}$$

where k is the servo track number, j is the sector number, $x_i$ is the radial offset of data track i from the servo track k, and P is a function of $x_i$ as shown in FIG. 6A.

Figure 6B:
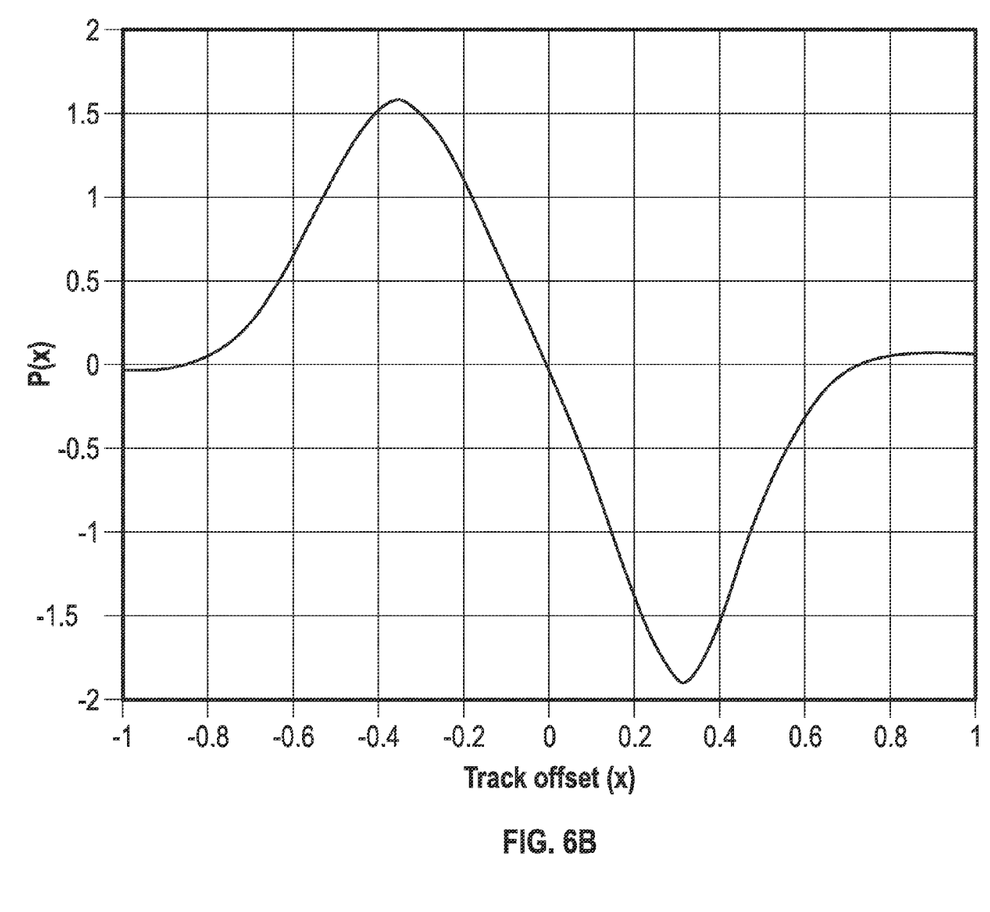
FIG. 6B is a graph of the function H(x) used to calculate the servo control loop gain correction from the two servo track RRO values.

The track shape errors due to runout also result in a gain variation because the PES scaling changes according to changes in spacing of the servo tracks. Gain variations can affect performance of the servo control loop. The gain variation is a function of the RRO of the servo tracks. Thus the servo control loop gain can be corrected at each servo sector according to the following equation:

$$\Delta Gain(k,x_i,j)=H(x_i)SRRO(k,j)+H(-(1-x_i)SRRO(k+1,j) \quad \text{Equation (2)}$$

where H is a function of x; as shown in FIG. 6B. The H function is approximately the slope of the P function.

Figure 7:
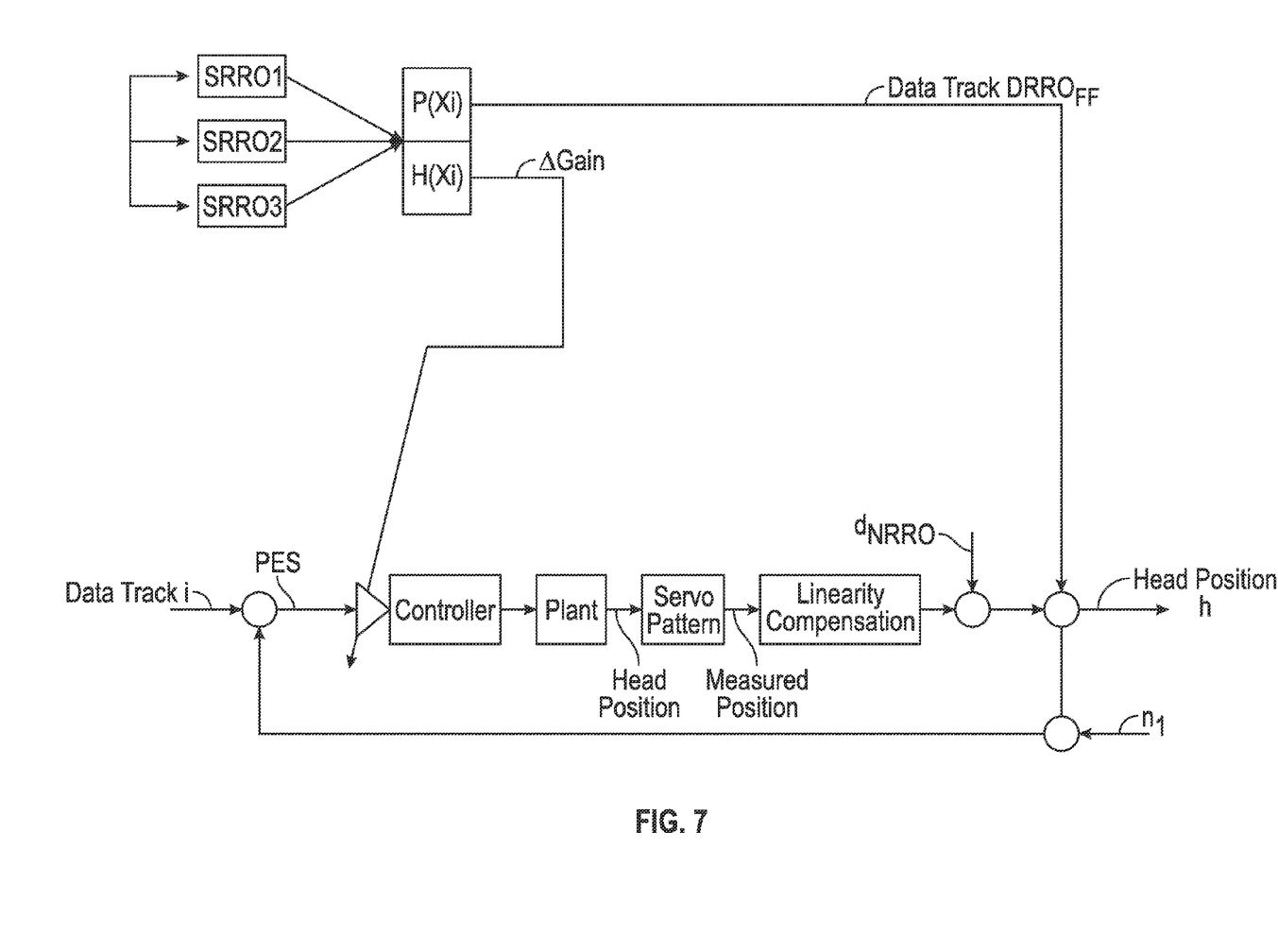
FIG. 7 is the servo control loop according to embodiments of the invention.

FIG. 7 is the servo control loop according to embodiments of the invention. The feed-forward data track RRO (DRRO$_{FF}$) is determined by interpolation as described above, using the P function, of two SRRO values read from two of the three slots containing the RRO fields shown in FIG. 5. The servo control loop gain is modified using the H function as shown by Equation (2). The term dNRRO refers to a non-repeatable runout disturbance.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising;
   a substrate;
   a recording layer on the substrate;
   a plurality of radially spaced servo tracks on the recording layer having a fixed servo track pitch and a plurality of angularly spaced servo sectors extending across the servo tracks;
   each servo track having a repeatable runout (RRO) field in each servo sector that extends radially into adjacent servo tracks, the RRO fields in each servo track being shifted radially from RRO fields in adjacent servo tracks and angularly spaced from RRO fields in adjacent servo tracks; and
   a plurality of radially spaced data tracks on the recording layer having a data track pitch different from the servo track pitch.

2. The disk of claim 1 wherein the disk is a shingled magnetic recording disk having overlapping data tracks.

3. The disk of claim 1 wherein each RRO field has a radial length equal to or greater than twice the servo track pitch.

4. The disk of claim 1 wherein the data track pitch is less than the servo track pitch.

5. The disk of claim 1 wherein the radially-shifted and angularly-spaced RRO fields in three adjacent servo tracks form a pattern that repeats radially every fourth servo track.

6. A magnetic recording disk drive comprising:
   the disk of claim 1;
   a read head for reading data from a data track and the RRO fields from adjacent servo tracks nearest said data track;
   an actuator connected to the read head for moving the read head radially; and
   servo electronics coupled to the read head and the actuator for adjusting the radial position of the read head in response to the RRO fields from adjacent servo tracks read by the read head.

7. The disk drive of claim 6 wherein the servo sectors include position error signal (PES) information and the servo electronics includes a processor for running a servo control loop that receives PES information read by the read head and outputs read head position to the actuator, wherein the processor is adapted to interpolate a RRO value from the RRO fields read by the read head from adjacent servo tracks and feed forward said interpolated RRO value to said servo control system to thereby modify said read head position.

8. The disk drive of claim 7 wherein the processor is adapted to modify the servo loop gain from the RRO fields read by the read head from adjacent servo tracks.

9. The disk drive of claim 6 wherein the disk drive is a shingled magnetic recording disk drive.

10. The disk drive of claim 6 wherein the disk drive includes a controller coupled to the servo electronics and a write head coupled to the actuator for writing data to the data tracks, the controller and servo electronics being adapted to cause the actuator to move the write head radially so as to change the track pitch of the data tracks.

11. A magnetic recording disk drive comprising;
  a magnetic recording disk comprising
    a substrate;
    a recording layer on the substrate;
    a plurality of radially spaced data tracks having a data track pitch on the recording layer;
    a plurality of radially spaced servo tracks on the recording layer having a fixed servo track pitch different from the data track pitch and a plurality of angularly spaced servo sectors extending across the servo tracks;
    each servo track having a repeatable runout (RRO) field in each servo sector that has a radial length equal to or greater than twice the servo track pitch, the RRO fields in each servo track being shifted radially from RRO fields in adjacent servo tracks and angularly spaced from RRO fields in adjacent servo tracks;
  a read head for reading data from a data track and the RRO fields from adjacent servo tracks nearest said data track;
  a write head for writing data to the data tracks;
  an actuator connected to the read head and write head for moving the read and write heads radially;
  servo electronics coupled to the read head and the actuator for adjusting the radial position of the read head in response to the RRO fields from adjacent servo tracks read by the read head; and
  a controller coupled to the servo electronics, the controller and servo electronics being adapted to cause the actuator to move the write head radially so as to change the track pitch of the data tracks.

12. The disk drive of claim 11 wherein the disk drive is a shingled magnetic recording disk drive, wherein the write head has a cross-track width greater than the cross-track width of the read head and the disk has overlapping data tracks.

13. The disk drive of claim 11 wherein the data track pitch is less than the servo track pitch.

14. The disk drive of claim 11 wherein the radially-shifted and angularly-spaced RRO fields in three adjacent servo tracks form a pattern that repeats radially every fourth servo track.

15. The disk drive of claim 11 wherein the servo sectors include position error signal (PES) information and the servo electronics includes a processor for running a servo control loop that receives PES information read by the read head and outputs read head position to the actuator, wherein the processor is adapted to interpolate a RRO value from the RRO fields read by the read head from adjacent servo tracks and feed forward said interpolated RRO value to said servo control system to thereby modify said read head position.

16. The disk drive of claim 15 wherein the processor is adapted to modify the servo loop gain from the RRO fields read by the read head from adjacent servo tracks.

* * * * *